(12) United States Patent
Maruyama (10) Patent No.: US 11,216,777 B2
(45) Date of Patent: Jan. 4, 2022

(54) COMPONENT ORDERING SYSTEM

(71) Applicant: TOYOTA JIDOSHA KABUSHIKI KAISHA, Toyota (JP)

(72) Inventor: Yuki Maruyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 16/405,375

(22) Filed: May 7, 2019

(65) Prior Publication Data

US 2019/0347609 A1 Nov. 14, 2019

(30) Foreign Application Priority Data

May 9, 2018 (JP) .............................. JP2018-090559

(51) Int. Cl.
*G06Q 10/08* (2012.01)
*G06K 7/10* (2006.01)
*G06K 7/14* (2006.01)

(52) U.S. Cl.
CPC ....... *G06Q 10/087* (2013.01); *G06K 7/10415* (2013.01); *G06K 7/14* (2013.01)

(58) Field of Classification Search
CPC .... G06Q 10/087; G06K 7/10415; G06K 7/14; G06K 7/1413; G06K 13/07; G05B 19/4183
See application file for complete search history.

(56) References Cited

U.S. PATENT DOCUMENTS

| | | | | |
|---|---|---|---|---|
| 5,010,238 | A * | 4/1991 | Kadono | G07F 19/207 235/379 |
| 6,579,182 | B1 * | 6/2003 | Orus | G07F 17/32 463/29 |
| 9,251,663 | B1 * | 2/2016 | Sandvick | G07F 17/3258 |
| 2010/0312701 | A1 * | 12/2010 | Bosch | G06Q 20/1085 705/43 |

(Continued)

FOREIGN PATENT DOCUMENTS

| | | |
|---|---|---|
| JP | 2000-29964 A | 1/2000 |
| JP | 2005-202774 A | 7/2005 |

(Continued)

*Primary Examiner* — Peter Ludwig
*Assistant Examiner* — Michael Jared Walker
(74) *Attorney, Agent, or Firm* — Sughrue Mion, PLLC (57) ABSTRACT

A component ordering system that is efficient in component ordering work is provided, in which component ordering information read from a Kanban is transmitted to a server so that the server transmits the component ordering information to a component supplier. A bar-code reading device determines whether the component ordering information is registered in the server based on reply information transmitted from a server in response to information transmitted to the server after the Kanban is inserted into a Kanban insertion slot. When it is determined that the component ordering information is not registered in the server, the bar-code reading device notifies that the component ordering information is not registered while holding the Kanban without discharging it to the Kanban receiving part. Thus, it is possible to maintain reliability in component order as well as to improve efficiency in component ordering work.

7 Claims, 9 Drawing Sheets

(56) References Cited

U.S. PATENT DOCUMENTS

| | | | |
|---|---|---|---|
| 2015/0331378 A1* | 11/2015 | Kawana | G03G 15/5079 |
| | | | 399/8 |
| 2016/0275631 A1* | 9/2016 | Serizawa | G06Q 50/12 |
| 2016/0379282 A1* | 12/2016 | Hill | G06Q 30/0601 |
| | | | 705/26.1 |
| 2017/0011337 A1* | 1/2017 | Matityaho | G06Q 10/087 |
| 2017/0070842 A1* | 3/2017 | Kulp | H04L 12/2803 |
| 2017/0206730 A1* | 7/2017 | Iwasaki | B65H 5/38 |
| 2017/0287255 A1* | 10/2017 | Takeda | G07D 11/16 |
| 2018/0082088 A1* | 3/2018 | Sehmer | G06K 7/10821 |
| 2018/0096539 A1* | 4/2018 | Merg | G06Q 10/20 |
| 2018/0114161 A1* | 4/2018 | Carman | G06Q 10/0635 |
| 2018/0121866 A1* | 5/2018 | Higham | G06Q 10/087 |

FOREIGN PATENT DOCUMENTS

| | | | |
|---|---|---|---|
| JP | 2006-227972 A | | 8/2006 |
| JP | 2006227972 A | * | 8/2006 |
| JP | 2006-323703 A | | 11/2006 |
| JP | 2008-299584 A | | 12/2008 |
| JP | 2009-073633 A | | 4/2009 |
| JP | 2009073633 A | * | 4/2009 |
| JP | 2010-176401 A | | 8/2010 |

* cited by examiner

| READY | COMM | READ | Buzzer | State |
|---|---|---|---|---|
| Flashing | Extinguished | Extinguished | | Starting up |
| Lit | Lit | Extinguished | | Standing by |
| Lit | Lit | Lit | | Information reading OK |
| Lit | Lit | Lit | ON | Information reading NG |
| Lit | Lit | Flashing | ON | Reception error |
| Lit | Lit | Extinguished | | Not registered |
| Lit | Lit | Extinguished | | Kanban taken out |
| Lit | Flashing | Extinguished | | Receiving/transmitting data |
| Flashing | Flashing | Flashing | | Switched to power off |
| Extinguished | Extinguished | Extinguished | | Power off |
| Lit | Flashing | Extinguished | | Communication unestablished |

COMPONENT ORDERING SYSTEM

CROSS-REFERENCE TO RELATED APPLICATIONS

The present application claims priority under 35 U.S.C. § 119(a) to Japanese Patent Application No. 2018-90559, filed on May 9, 2018. The contents of this application are incorporated herein by reference in its entirety.

TECHNICAL FIELDS

The present invention relates to a component ordering system that is installed, for example, in an automobile manufacturing plant. In particular, the present invention relates to a measure to efficiently perform ordering work while maintaining reliability in the component order.

BACKGROUND ART

Conventionally, when there is a shortage of components in, for example, an automobile manufacturing plant (component consumer), the production using such components cannot be continued. On the other hand, having the components excessively in stock in the manufacturing plant requires a superfluous inventory space, which may exert negative influence on production costs due to carrying costs. Thus, it is important to manage the amount of components delivered from the component manufacturer (component supplier) in order to efficiently perform the manufacturing control. As a method for managing the amount of components delivered, a method so-called "Kanban method" is known. In the "Kanban method", the amount of components to be delivered is managed using a component order card (hereinafter occasionally referred to as "Kanban") for instruction of the delivery timing and amount of the components to be ordered to the component supplier based on a planned component consumption that has been planned in advance, assuming that the number of the components that have been once consumed is approximately the same as the number that will be consumed next time.

Patent Document 1 discloses a managing system using the "Kanban method" in which when a Kanban is inserted into a Kanban reader-writer, the Kanban reader-writer reads component ordering information from the Kanban so as to process the thus-read component ordering information by a manufacturing control terminal or a manufacturing control server.

PRIOR ART DOCUMENT

Patent Document

Patent Document 1: JP 2006-227972 A

SUMMARY OF THE INVENTION

Problem to be Solved by the Invention

In the above-described "Kanban method", a special operation is needed to confirm whether the reading of the component ordering information by the Kanban reader-writer has been normally performed. For example, it is necessary to monitor whether there is a Kanban ID transmitted from the production planning server that is the same as the Kanban ID transmitted from the Kanban reader-writer. Therefore, there is a limit to efficiently perform the component ordering work.

The present invention was made in consideration of the above circumstances, an object of which is to provide a system configuration capable of efficiently performing the component ordering work in a component ordering system in which component ordering information read from a Kanban (a component order card) is transmitted to a server so as to transmit the component ordering information from the server to a component supplier (a component manufacturer).

Means for Solving the Problem

As the means for solving the problem of the present invention to achieve the above object, the following component ordering system is provided. The component ordering system includes: a server; and an ordering information reading device. The ordering information reading device is configured to read component ordering information from a component order card and to transmit, to the server, the thus-read component ordering information so that the component ordering information is registered in the server. The server is configured to transmit the component ordering information to a component supplier. The ordering information reading device includes: a card insertion slot into which the component order card is inserted; and a card receiving part to which the component order card whose component ordering information has been read is discharged. The ordering information reading device includes: a determination unit configured to determine whether the component ordering information is registered or not in the server based on reply information that is transmitted from the server in response to information that is transmitted from ordering information reading device to the server after the component order card is inserted into the card insertion slot; a holding part configured to hold the component order card without discharging it to the card receiving part when the determination unit determines that the component ordering information is not registered in the server; and a notification unit configured to notify the server of a fact that the component ordering information is not registered in the server.

With the above configuration, when placing the order of the components to a component supplier, a worker inserts the component order card into the card insertion slot of the ordering information reading device. That is, for the worker, there is no need to add any special operation to read the component ordering information on the component order card. When the component order card is properly inserted, the ordering information reading device reads the component ordering information from the component order card and transmits the thus-read component ordering information to the server so that the component ordering information is registered in the server. Then, the component order card whose component ordering information has been read is discharged to the card receiving part. The server transmits the component ordering information to the component supplier. In this way, the component supplier manufactures and delivers the components according to the received component ordering information.

In contrast, when the component ordering information is not properly read, the information transmitted to the server is also improper. Then, in the ordering information reading device, the determination unit determines, based on the reply information transmitted from the server as a response, that the component ordering information is not registered in the server. In this case, the holding part disposed in the ordering information reading device holds the component order card without discharging it to the card receiving part. Also, the notification unit provided in the ordering information reading device notifies the fact that the component ordering information is not registered in the server. By this notification from the notification unit, the worker recognizes that the component ordering information has not been registered in the server and that the component order card is being held by the holding part. Thus, the worker inserts, once again, the held component order card into the card insertion slot so that the component ordering information is read from the component order card. In other words, the worker easily recognizes the component order card that is needed to be inserted again into the card insertion slot, which contributes to maintenance of reliability in the component order as well as to efficiency in the component ordering work.

Also, it is preferable that the server includes an installation location data storage unit that is configured to store data on installation location of the ordering information reading device. The component ordering system preferably further includes an installation location registering device that is configured to acquire data on the individual information and the installation location of the ordering information reading device from the ordering information reading device. The data on the individual information and the installation location acquired by the installation location registering device is preferably transmitted to the server so that the installation location data storage unit stores the data on the individual information and the installation location. When the ordering information reading device is activated and activation notification information is transmitted from the ordering information reading device to the server, the data on the individual information and the installation location of the ordering information reading device is preferably transmitted, as a response, from the server to the ordering information reading device.

With the above configuration, every time the ordering information reading device is activated, the data on the individual information and the installation location of the ordering information reading device is transmitted, as a response, from the server to the ordering information reading device. Thus, the ordering information reading device is not required to have a non-volatile memory so as to store the data on the individual information and the installation location when the power is turned off, which leads to reduction in costs for the ordering information reading device. Generally, many components are used in the automobile manufacturing plant and the like, which results in a large number of ordering information reading devices. However, in this configuration, the cost for each ordering information reading device can be reduced, which leads to considerable reduction in costs in the whole manufacturing plant.

Also, it is preferable that the ordering information reading device determines that an abnormal state occurs when the ordering information reading device does not receive the data on the individual information and the installation location from the server within a predetermined period from a time point when the ordering information reading device transmits the activation notification information to the server subsequent to the activation of the ordering information reading device.

With the above configuration, when the data on the individual information and the installation location corresponding to the activated ordering information reading device is not transmitted from the server as a response, it is supposed that a communication error occurs between the ordering information reading device and the server or that the ordering information reading device is not registered. Accordingly, the ordering information reading device determines that an abnormal state occurs. Thus, the worker can operate to remove the abnormality determination (for example, operation to dissolve the communication error and registration operation of the non-registered ordering information reading device) so that the system normally operates.

Also, it is preferable that, when the ordering information reading device does not receive the reply information from the server within a predetermined period from a time point when the component order card is inserted into the card insertion slot, the ordering information reading device determines that an abnormal state occurs.

When the reply information is not transmitted from the server within the predetermined period from the time point when the component order card is inserted into the card insertion slot, it is supposed that the component order card is not properly inserted into the card insertion slot or that the component ordering information in not properly read from the component order card. Accordingly, the ordering information reading device determines that an abnormal state occurs. Thus, the worker re-inserts the component order card so that the component ordering information is properly read, which contributes to maintenance of high reliability in the component order.

Also, it is preferable that, when the ordering information reading device does not transmit any information to the server over a predetermined period after the ordering information reading device has transmitted information to the server, the ordering information reading device transmits, to the sever, information that the ordering information reading device normally runs.

If there is an ordering information reading device that has not transmitted any information (such as the component ordering information) to the server over the predetermined period, it is preferable to find any defect that may generated in the ordering information reading device at an initial stage. For this reason, in this configuration, the ordering information reading device, which has not transmitted any information to the server over the predetermined period, transmits information to notify the server of the normal running state of the ordering information reading device at the time point when the predetermined period elapses. Thus, the server can recognize that the ordering information reading device normally runs. In this way, when there still is an ordering information reading device that does not transmit any information to the server after the predetermined period elapses, it is possible to recognize, at an initial stage, that such an ordering information reading device does not run normally. Thus, it is possible to maintain or replace the ordering information reading device promptly, which contributes to stabilization in the operation of the system.

Also, it is preferable that the card insertion slot is provided on an upper face of the ordering information reading device, and the card receiving part is provided on a lower face of the ordering information reading device.

With this configuration, it is possible to reduce the installation space for the ordering information reading device. Therefore, even when it is necessary to install a number of ordering information reading devices in the manufacturing plant, the work space in the manufacturing plant is not much limited due to such installation.

Advantageous Effect of the Invention

In the present invention, an ordering information reading device determines whether component ordering information is registered or not in a server based on reply information transmitted from the server as a response after a component order card is inserted into a card insertion slot. When it is determined that the component ordering information is not registered in the server, the ordering information reading device notifies the fact that the component ordering information is not registered while holding the component order card without discharging it to a card receiving part. Thus, a worker can easily recognize the component order card that is needed to be inserted again into the card insertion slot, which contributes to maintenance of reliability in the component order as well as to efficiency in the component ordering work.

DESCRIPTION OF EMBODIMENTS

Hereinafter, embodiments of the present invention will be described with reference to the drawings. In this embodiment, a description is given on a case in which the present invention is applied to a component ordering system that is installed in an automobile manufacturing plant.

Figure 1:
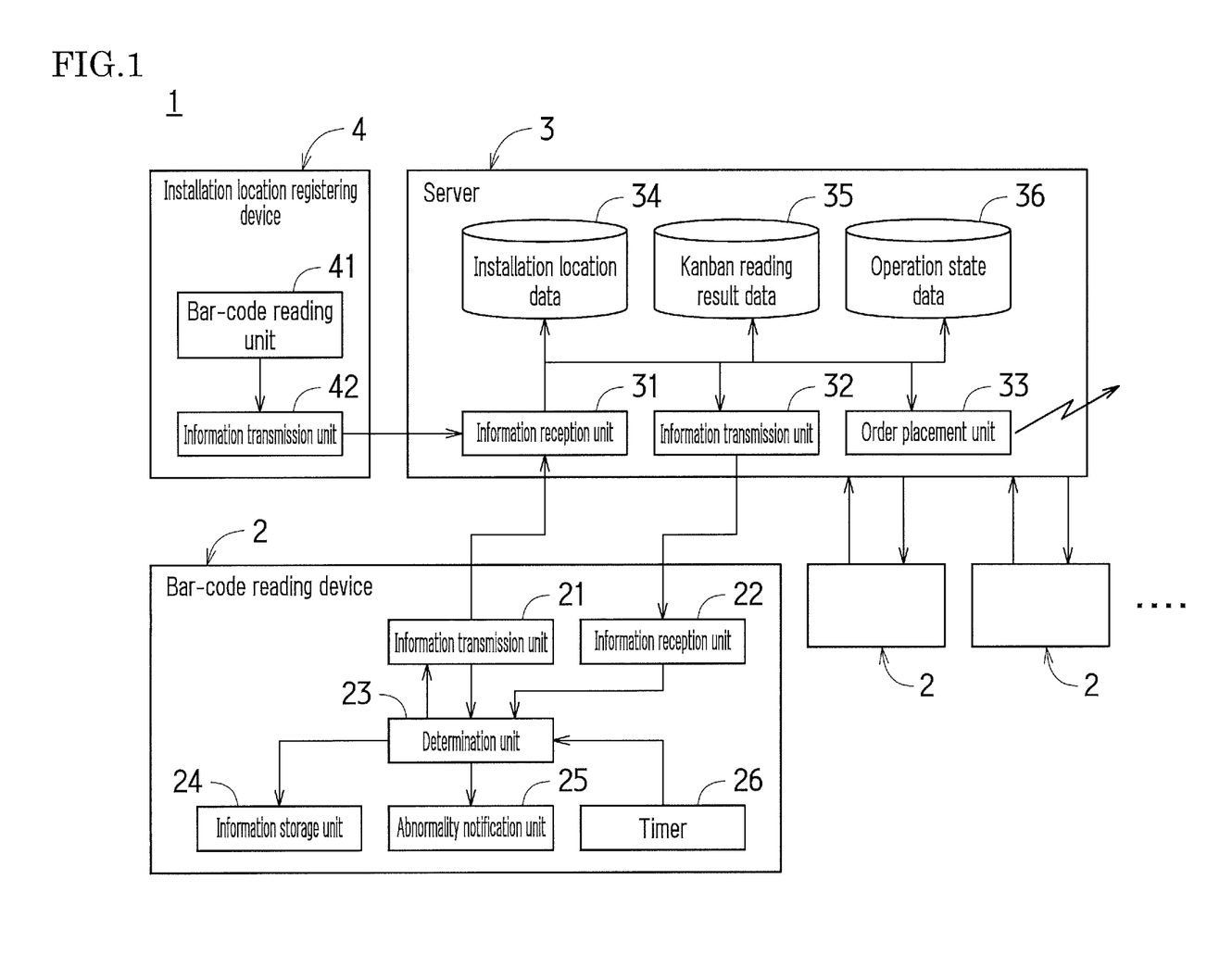
FIG. 1 is a block diagram illustrating an overall configuration of a component ordering system.

FIG. 1 is a block diagram illustrating an overall configuration of a component ordering system 1 according to this embodiment. As shown in FIG. 1, the component ordering system 1 according to this embodiment includes: a plurality of bar-code reading devices (ordering information reading devices) 2; a server (a data storage device) 3; and an installation location registering device 4. In FIG. 1, among the plurality of bar-code reading devices 2, one bar-code reading device 2 is illustrated to show the inside configuration (i.e. as a block diagram illustrating its overall configuration). The bar-code reading devices 2, the server 3 and the installation location registering device 4 are capable of communicating with each other via a network such as a LAN (wireless LAN) in the manufacturing plant. Hereinafter, each element will be described in detail.

—Bar-Code Reading Device—

A main function of the bar-code reading device 2 is to read component ordering information from a bar-code 10a displayed on a Kanban 10 (a component order card; see FIG. 3) inserted thereinto, and to transmit the component ordering information to the server 3.

The bar-code reading device 2 is installed at each assembly station on the production line. The bar-code reading device 2 includes: an information transmission unit 21; an information reception unit 22; a determination unit 23; an information storage unit 24; an abnormality notification unit (a notification unit) 25; and a timer 26.

The information transmission unit 21 transmits the component ordering information, which has been read from the bar-code 10a on the Kanban 10, to the server 3 (i.e. an information transmission operation in a component ordering operation that is described later). Also, the information transmission unit 21 transmits, apart from the component ordering information, activation notification information to the server 3 (i.e. an information transmission operation in an activation operation that is described later). Furthermore, the information transmission unit 21 transmits running state notification information to the server 3 (i.e. an information transmission operation in a running state confirmation operation that is described later).

The information reception unit 22 receives various kinds of information transmitted from the server 3. Examples of the reception operation of the various kinds of information include: reception of setting information of the bar-code reading device 2 (i.e. an information reception operation in the activation operation of the bar-code reading device 2 that is described later); and reception of response result information (registration result information on Kanban information) for notifying that the component ordering information is normally received (i.e. an information reception operation in the component ordering operation that is described later).

The determination unit 23 determines whether the information received by the information reception unit 22 from the server 3 is appropriate or not. That is, the determination unit 23 determines whether the setting information of the bar-code reading device 2 is appropriate or not (i.e. a determination operation in the activation operation of the bar-code reading device 2 that is described later) or whether the response result information is appropriate or not (i.e. a determination operation in the component ordering operation that is described later).

The information storage unit 24 temporarily (for example, until the power of the bar-code reading device 2 is turned off) stores the information received as described above (i.e. the information received by the information reception unit 22 from the server 3) when the determination unit 23 determines that the information is appropriate.

The abnormality notification unit 25 performs an abnormality notification operation without storing the information received as described above (i.e. the information received by the information reception unit 22 from the server 3) when the determination unit 23 determines that the information is inappropriate, so that a worker can recognize that the received information is inappropriate. Specific examples of the abnormality notification operation includes: flashing of a lamp; and sounding of a buzzer, which are provided in the bar-code reading device 2.

The timer 26 starts counting at the time point when the transmission unit 21 performs the information transmission operation to the server 3 so as to transmit information such as the activation notification information or the component ordering information. Then, after the activation notification information is transmitted, the timer 26 transmits a time-up signal (a first time-up signal) to the determination unit 23 when the predetermined time (for example, 3 sec) elapses. If the setting information is not received yet from the server 3 at this time point, the abnormality notification unit 25 performs the abnormality notification operation. Also, the timer 26 transmits a time-up signal (a second time-up signal) to the determination unit 23 when the predetermined time (for example, 30 min) elapses while no component ordering information is transmitted. At this time point, the determination unit 23 transmits an instruction to the information transmission unit 21 to output the running state notification information, and thus, the information transmission unit 21 transmits the running state notification information to the server 3 (i.e. an information transmission operation in the running state confirmation operation that is described later).

Figure 2:
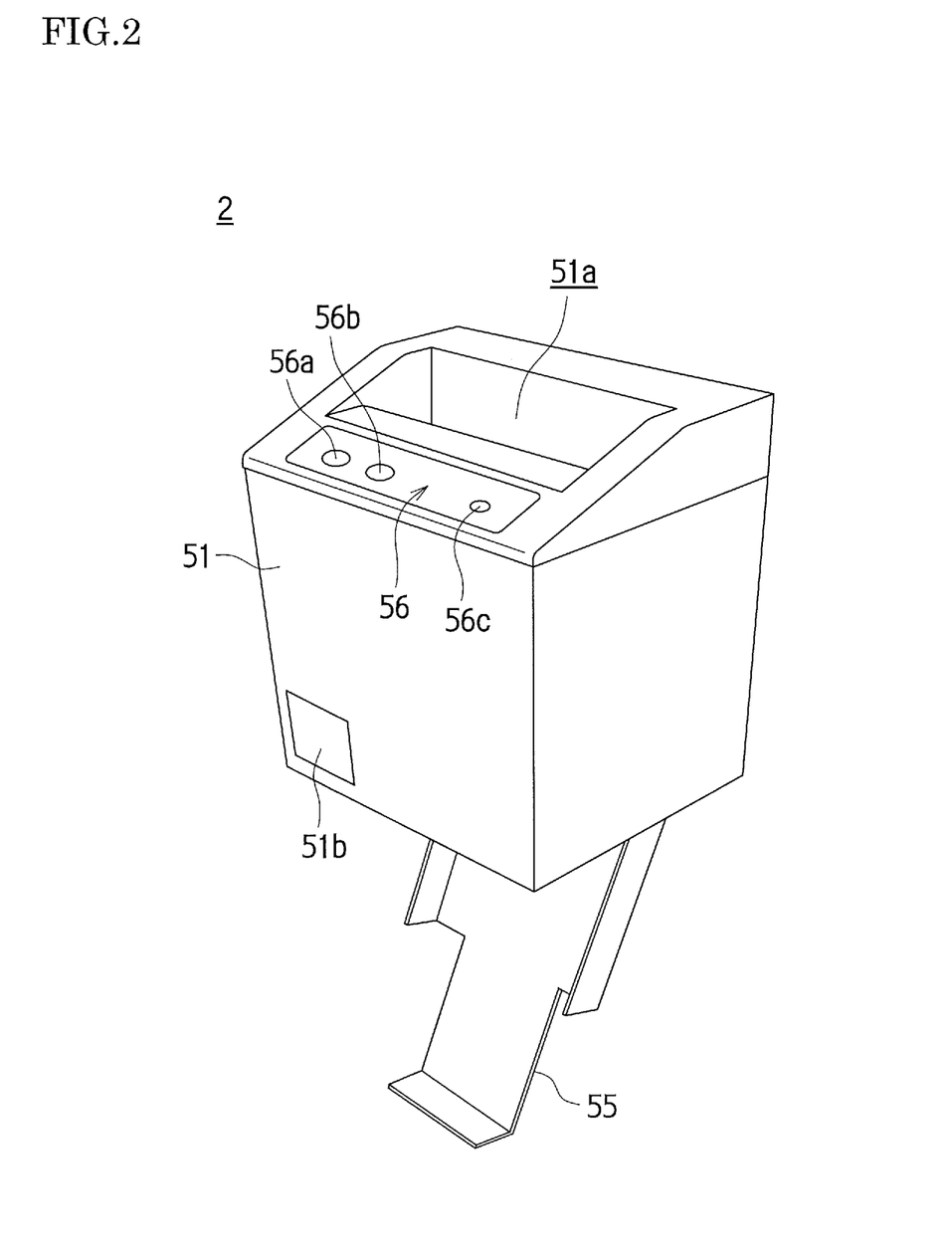
FIG. 2 is a perspective view illustrating an appearance of a bar-code reading device.
Figure 3:
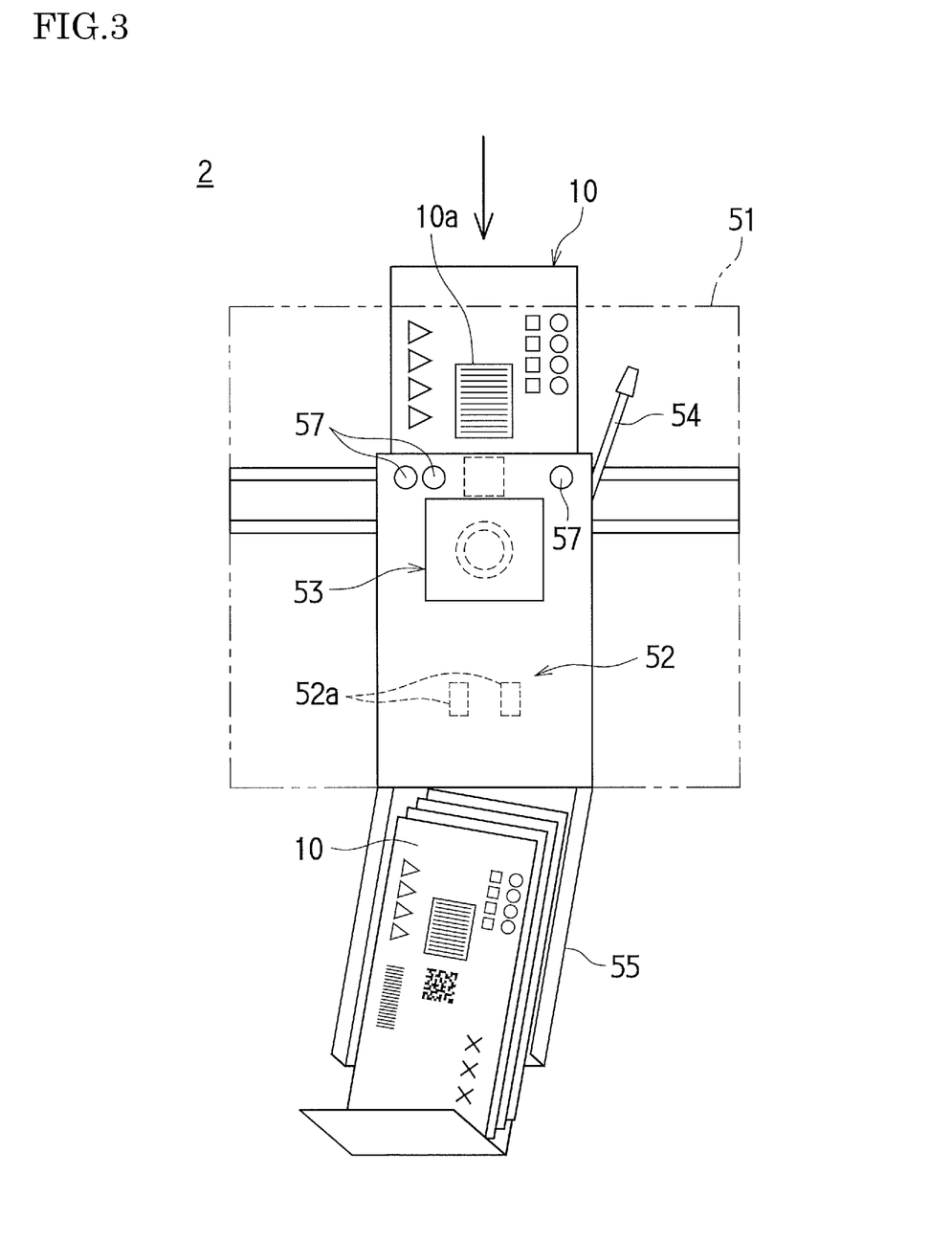
FIG. 3 is a front view illustrating an overall configuration of an inside of the bar-code reading device.
Figure 4:
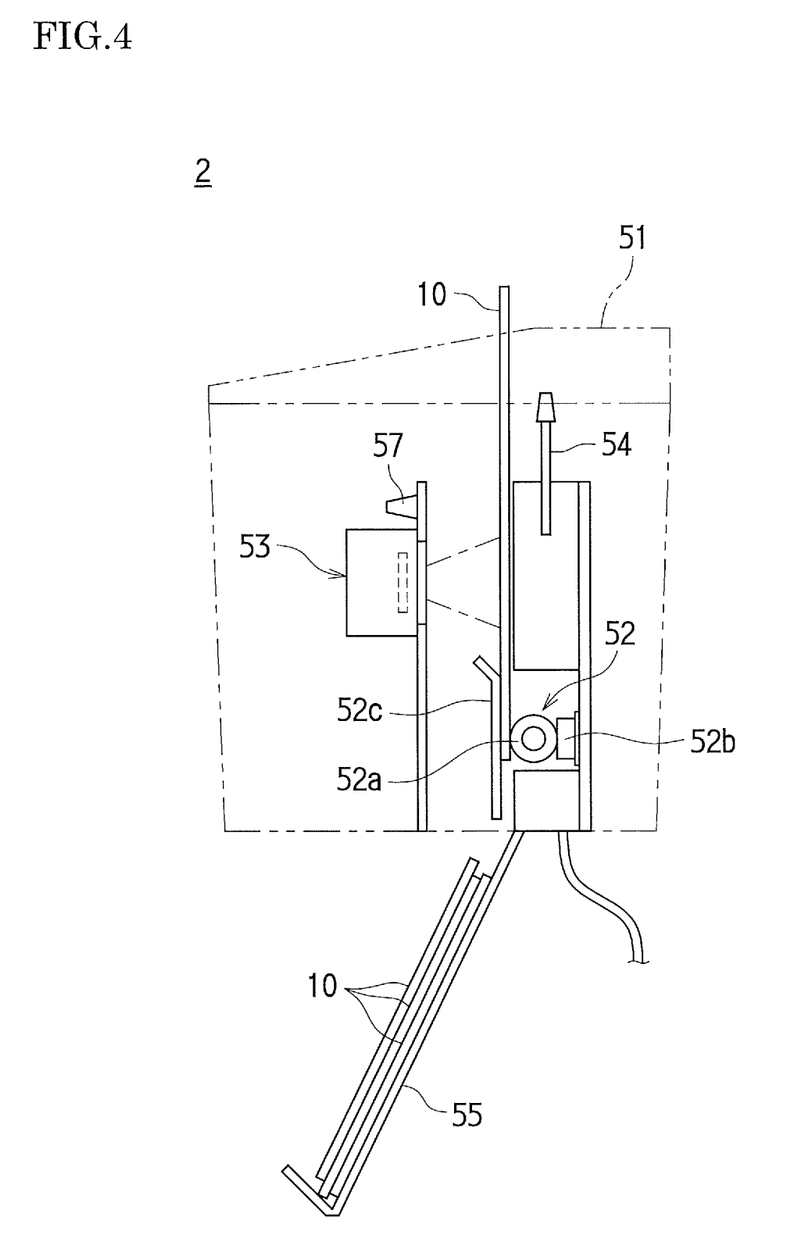
FIG. 4 is a side view illustrating an overall configuration of the inside of the bar-code reading device.

FIG. 2 is a perspective view illustrating an appearance of the bar-code reading device 2. FIG. 3 is a front view illustrating an overall configuration of the inside of the bar-code reading device 2. FIG. 4 is a side view illustrating an overall configuration of the inside of the bar-code reading device 2.

As shown in these Figures, the bar-code reading device 2 has a configuration in which a casing 51 houses: a Kanban transport part 52; a bar-code reading unit 53; and a communication antenna 54. Also, a Kanban insertion slot (a card insertion slot) 51*a* is provided on the upper face of the casing 51, into which the Kanban 10 is inserted. A Kanban receiving part (a card receiving part) 55 is attached to the lower face of the casing 51, to which the Kanban 10 is discharged.

A display panel 56 is provided on the upper face of the casing 51 so as to display the running state of the bar-code reading device 2.

The display panel 56 is provided with, on three parts thereof, lighting parts 56*a*, 56*b* and 56*c*. Each lighting part 56*a*, 56*b* and 56*c* includes an LED lamp 57. With the LED lamp 57, each lighting part 56*a*, 56*b* and 56*c* can be switched between red and green as luminescent colors, and also can be switched among the lit state, the extinguished state and the flashing state as the lighting states.

The Kanban insertion slot 51*a* disposed in the upper face of the casing 51 has the width and depth sufficiently larger than those of the Kanban 10. Thus, the Kanban 10 can be easily inserted into the Kanban insertion slot 51*a*. Also, guide plate 52*c* is disposed inside the casing 51 so as to guide the Kanban 10 inserted into the Kanban insertion slot 51*a* downward. Thus, the Kanban 10 inserted into the Kanban insertion slot 51*a* is guided by the guide plate 52*c* to a predetermined bar-code reading position.

The Kanban transport part 52 includes: a pair of transport rollers 52*a*; and a thickness sensor 52*b*. The transport rollers 52*a* are rotated by the power from an electric motor (not shown) so as to transport the Kanban 10 along a transport path by making contact with the Kanban 10. That is, when the electric motor drives and the transport rollers 52*a* are continuously rotated, the Kanban 10 is transported downward by the transport rollers 52*a*. In contrast, when the electric motor is stopped, the rotation of the transport rollers 52*a* is also stopped, thus the Kanban 10 is not anymore transported at this time point and is held at the stopped position. Thus, a holding part in the present invention is constituted of the transport rollers 52*a* and the guide plate 52*c*.

The thickness sensor 52*b* can detect the number of the Kanbans 10 that are sandwiched and held between the guide plate 52*c* and the transport rollers 52*a*. Specifically, the transport rollers 52*a* are supported in a movable manner in the front-back direction (i.e. the thickness direction of the Kanban 10; the left-right direction in FIG. 4) while receiving a biasing force toward the guide plate 52*c*. Thus, the thickness sensor 52*b* detects the position of the transport rollers 52*a* in the state in which the Kanbans 10 are sandwiched and held between the guide plate 52*c* and the transport rollers 52*a* so as to detect the number of the Kanbans 10.

The Kanban receiving part 55 is a part on which the Kanban 10 falls, after the Kanban 10 is transported through the transport path and discharged from a lower end of the casing 51 by the rotation of the transport rollers 52*a*. That is, the Kanban 10, which is transported downward by the rotation of the transport rollers 52*a*, is finally detached from the transport rollers 52*a* and discharged from the lower end of the casing 51 so as to fall on the Kanban receiving part 55.

The bar-code reading unit 53 is an imaging unit (for example, a CCD camera) that captures an image on the surface of the Kanban 10 transported through the transport path. Specifically, when the bar-code 10*a* displayed on the Kanban 10 transported through the transport path reaches the position in front of the bar-code reading unit 53, the bar-code reading unit 53 recognizes the above fact and stops the electric motor and accordingly the rotation of the transport rollers 52*a*, which makes possible to take an image of the bar-code 10*a* by the bar-code reading unit 53. Then, the component ordering information that is read by imaging is transmitted from the bar-code reading unit 53 to the information transmission unit 21, and the information transmission unit 21 causes the communication antenna 54 to transmit the component ordering information to the server 3.

As described above, in the bar-code reading device 2 according to this embodiment, the Kanban insertion slot 51*a* is disposed in the upper part (the upper part of the casing 51) while the Kanban receiving part 55 is disposed in the lower part (the lower part of the casing 51). Thus, it is possible to reduce the installation space for the bar-code reading device 2. Therefore, even when it is necessary to install a number of (for example, 1,000) bar-code reading devices 2 in the manufacturing plant, the work space in the manufacturing plant is not much limited due to such installation.

—Server—

A main function of the server 3 is to transmit the component ordering information that has been transmitted from the bar-code reading device 2 to the component manufacturer (component supplier).

The server 3 includes: an information reception unit 31; an information transmission unit 32; an order placement unit 33; an installation location data storage unit 34; a Kanban reading result data storage unit 35; and an operation state data storage unit 36.

The information reception unit 31 receives various kinds of information that is transmitted from the bar-code reading device 2 and the installation location registering device 4. Specifically, as described above, the information reception unit 31 receives the component ordering information, the activation notification information, and the running state notification information from the bar-code reading device 2. Also, the information reception unit 31 receives correlated information on the bar-code reading device 2 about the individual number (individual information) and the installation location, which is transmitted from the installation location registering device 4 (i.e. an information reception operation in a registration operation that is described later).

The information transmission unit 32 transmits, as a response, various kinds of information to the bar-code reading device 2. Specifically, the information transmission unit 32 transmits the response result information in respect of the reception of the component ordering information (i.e. an information reply operation in the component ordering operation that is described later), and also transmits the setting information of the bar-code reading device 2 in response to reception of the activation notification (i.e. an information reply operation in the activation operation that is described later). When the order placement unit receives properly the component ordering information, it transmits the component ordering information to the component manufacturer, for example, using a network such as the internet.

The installation location data storage unit 34 stores the setting information (i.e. correlated information of the individual number and the installation location) on each of the bar-code reading devices 2 that is transmitted from the installation location registering device 4.

The Kanban reading result data storage unit 35 stores (registers) the component ordering information that is transmitted from the bar-code reading device 2.

The operation state data storage unit 36 stores the running state data of each of the bar-code reading devices 2 based on information (such as the running state notification information) transmitted from the bar-code reading device 2.

—Installation Location Registering Device—

A main function of the installation location registering device 4 is to read, from the bar-code reading device 2, data on the individual number and the installation location (i.e. installation location in the manufacturing plant) of the bar-code reading device 2, and to transmit the correlated information of the above data to the server 3.

The installation location registering device 4 includes a bar-code reading unit 41 and an information transmission unit 42.

Figure 6:
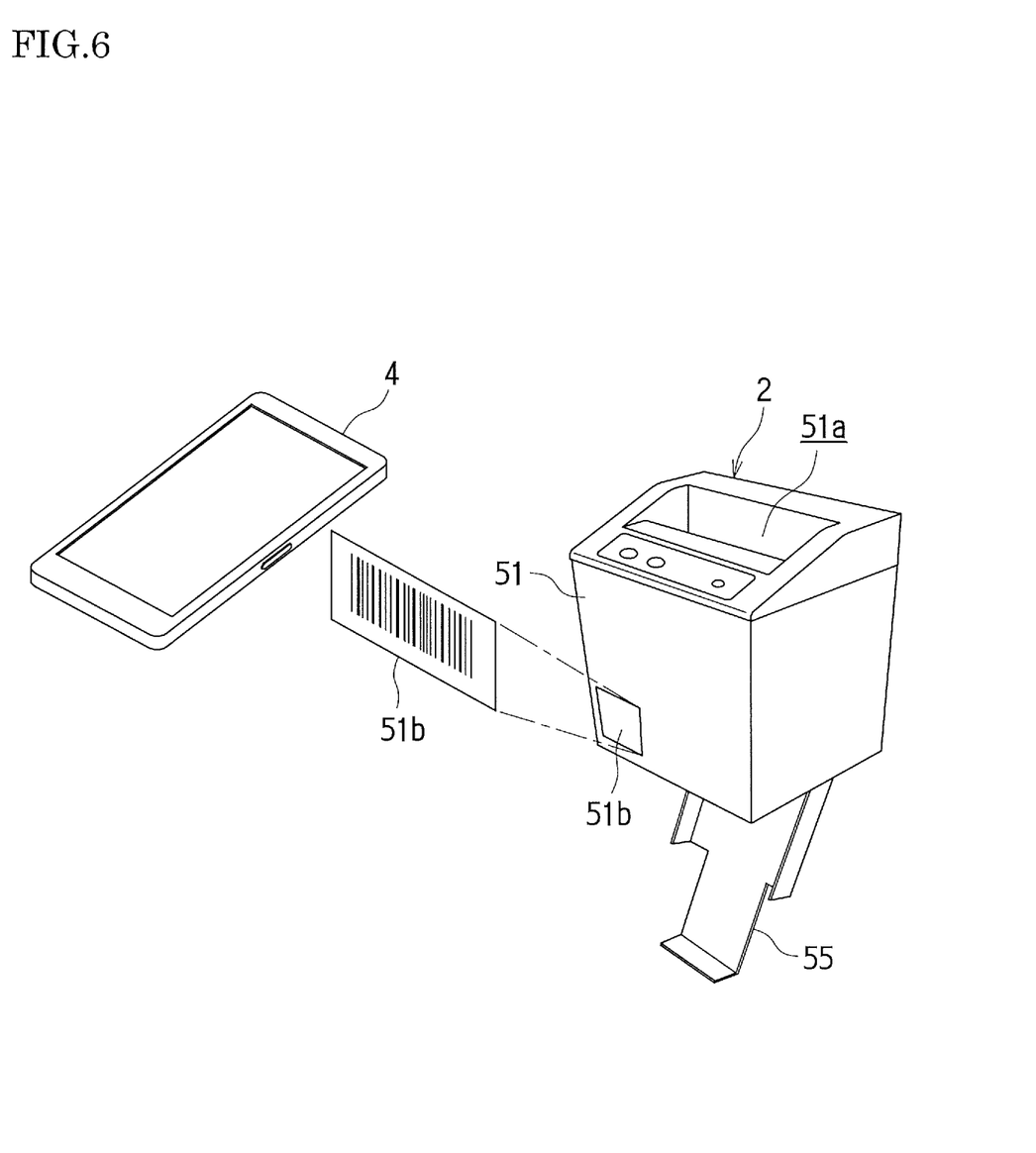
FIG. 6 is a perspective view illustrating an information reading operation by an installation location registering device.

The bar-code reading unit 41 reads the data on the individual number and the installation location of the bar-code reading device 2 from a bar-code 51b that is adhered to the front surface of the casing 51 of the bar-code reading device 2 (see FIG. 6). That is, in the bar-code 51b is recorded the data on the individual number and the installation location corresponding to the bar-code reading device 2 to which the bar-code 51b is adhered. The bar-code reading unit 41 reads the data. Also in the bar-code 51b, information on the reception site (i.e. the number of a specific building among the multiple buildings in the manufacturing plant) is recorded, as the installation location of the bar-code reading device 2, which is also read by the bar-code reading unit 41.

The information transmission unit 42 transmits the correlated information of the individual number and the installation location of the bar-code reading device 2 to the server 3 (i.e. an information transmission operation in the registration operation that is described later).

—Kanban—

The Kanban 10 is a rectangular-shaped card made of paper. On one surface thereof, various kinds of information is displayed. Specifically, on the center part of the Kanban 10, the component ordering information is displayed as the bar-code 10a. Examples of the component ordering information include: the order number of the components; the kind of the components; the required number of the components; the delivery date of the components; and the reception site in the manufacturing plant. Like this, the bar-code 10a is displayed on the center part of the Kanban 10. Accordingly, regardless the direction of the Kanban 10 inserted into the Kanban insertion slot 51a of the bar-code reading device 2 (even when it is inserted upside down), the Kanban 10 can be transported so that it can reach the position where the bar-code 10a faces the bar-code reading unit 53.

Thus, when the Kanban 10 is inserted into the Kanban insertion slot 51a of the bar-code reading device 2 and then the bar-code 10a is imaged and read by the bar-code reading unit 53, the above-described various kinds of information is transmitted to the server 3.

—Operations of Component Ordering System—

Here, the operations of the component ordering system 1 configured as described above will be described. The operations of the component ordering system 1 include: the registration operation with respect to the bar-code reading device 2; the activation operation with respect to the bar-code reading device 2; the component ordering operation; and the running state confirmation operation with respect to the bar-code reading device 2. Hereinafter, the respective operations will be described in detail.

(Registration Operation with Respect to Bar-Code Reading Device)

The registration operation with respect to the bar-code reading device 2 is performed when a new bar-code reading device 2 is installed in the automobile manufacturing plant or when a bar-code reading device 2 is re-registered after it is substituted for old one or it has been maintained.

Figure 5:
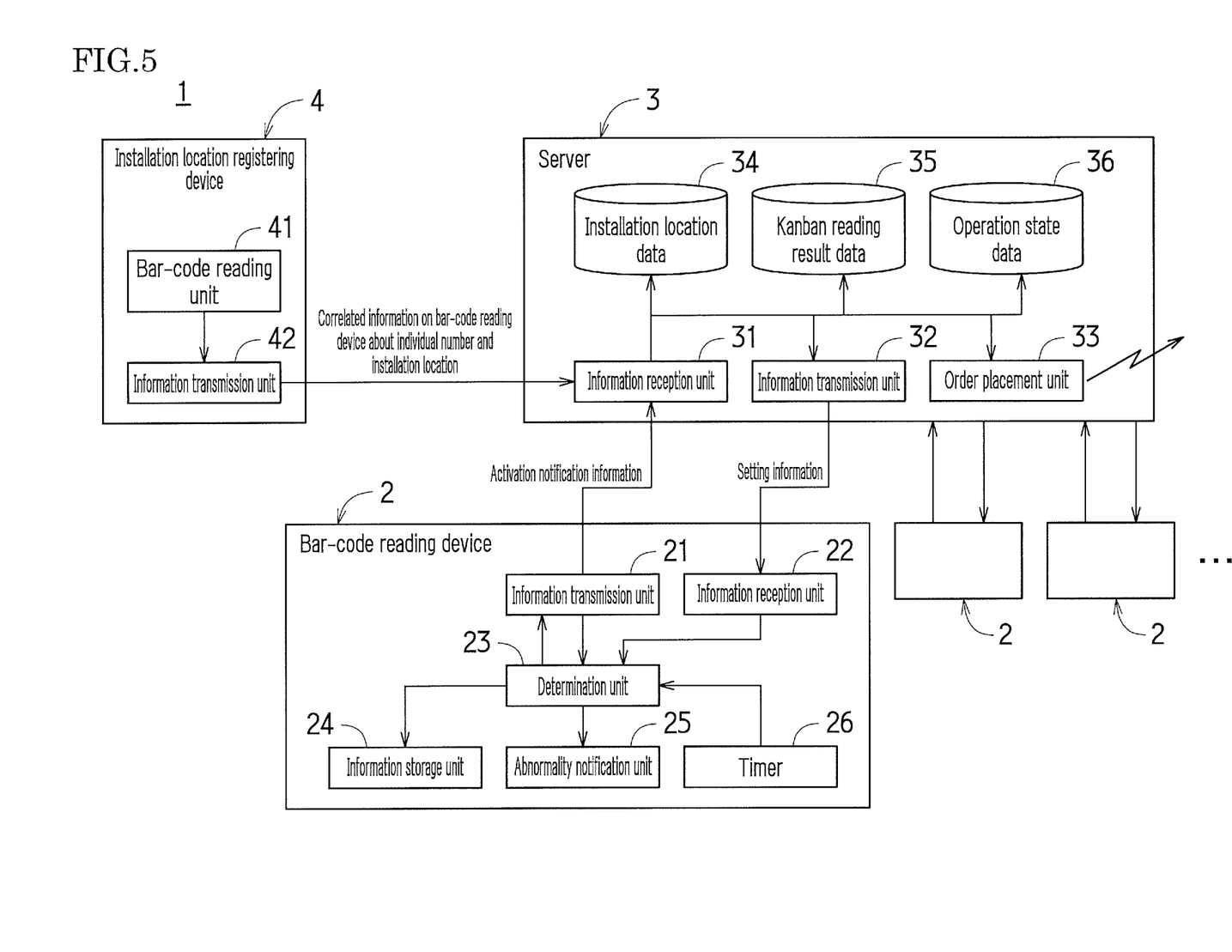
FIG. 5 is a diagram corresponding to FIG. 1 for explaining a registration operation and an activation operation with respect to the bar-code reading device.

FIG. 5 is a diagram corresponding to FIG. 1 for explaining a registration operation with respect to the bar-code reading device 2. In the registration operation with respect to the bar-code reading device 2 in FIG. 5, the installation location registering device 4 reads, from the bar-code 51b adhered to the front surface of the target bar-code reading device 2, the data such as the individual number and the installation location of the bar-code reading device 2, as shown in FIG. 6.

Then, the installation location registering device 4 transmits the correlated information of the individual number and the installation location of the bar-code reading device 2 to the server 3. Thus, the installation location data storage unit 34 of the server 3 stores the setting information (i.e. the correlated information of the individual number and the installation location) of the bar-code reading device 2. The installation location data storage unit 34 is constituted of a non-volatile memory (for example, EEPROM), accordingly, the stored setting information is not deleted even when the power of the server 3 is turned off.

(Activation Operation with Respect to Bar-Code Reading Device)

The activation operation with respect to the bar-code reading device 2 is performed when the bar-code reading device 2 is activated (the power thereof is turned on) in the state in which the setting information (i.e. the correlated information of the individual number and the installation location) of the bar-code reading device 2 is stored in the installation location data storage unit 34 of the server 3 by the above-described registration operation with respect to the bar-code reading device 2.

When the bar-code reading device 2 is activated, the bar-code reading device 2 transmits the activation notification information to the server 3. When the server 3 receives the activation notification information, the server 3 determines whether the installation location data storage unit 34 stores the correlated information of the individual number and the installation location of the bar-code reading device 2 corresponding to the received activation notification information. If the correlated information is stored, the server 3 determines that the received activation notification information is appropriate and transmits the data on the individual number and the installation location as the correlated information to the bar-code reading device 2 as the sender of the activation notification. Thus, the bar-code reading device 2 stores its own individual number and installation location. This information is stored in a volatile memory provided in the bar-code reading device 2, and accordingly is deleted when the power of the bar-code reading device 2 is turned off. However, when the power of the bar-code reading device 2 is turned on again (i.e. when the bar-code reading device 2 is re-activated), the bar-code reading device 2 performs the above communication with the server 3 again, thus the bar-code reading device 2 re-stores its own individual number and installation location. In this way, the configuration of the bar-code reading device 2 can be simplified, which leads to reduction in costs.

On the other hand, when the server 3 receives the activation notification information from the bar-code reading device 2, and the server 3 determines that the installation location data storage unit 34 stores no correlated information of the individual number and the installation location of the bar-code reading device 2 corresponding to the received activation notification information, the server 3 transmits an abnormal signal to the bar-code reading device 2. In response to the above, the abnormality notification unit 25 performs the abnormality notification operation.

Furthermore, when the bar-code reading device 2 is activated, the timer 26 starts counting at the time point when the bar-code reading device 2 transmits the activation notification information to the server 3. Then, if the server 3 does not respond before the timer finishes counting (i.e. before the first time-up signal is transmitted), the determination unit 23 determines that it is an abnormal state. In this case also, the abnormality notification unit 25 performs the abnormality notification operation.

(Component Ordering Operation)

Figure 7:
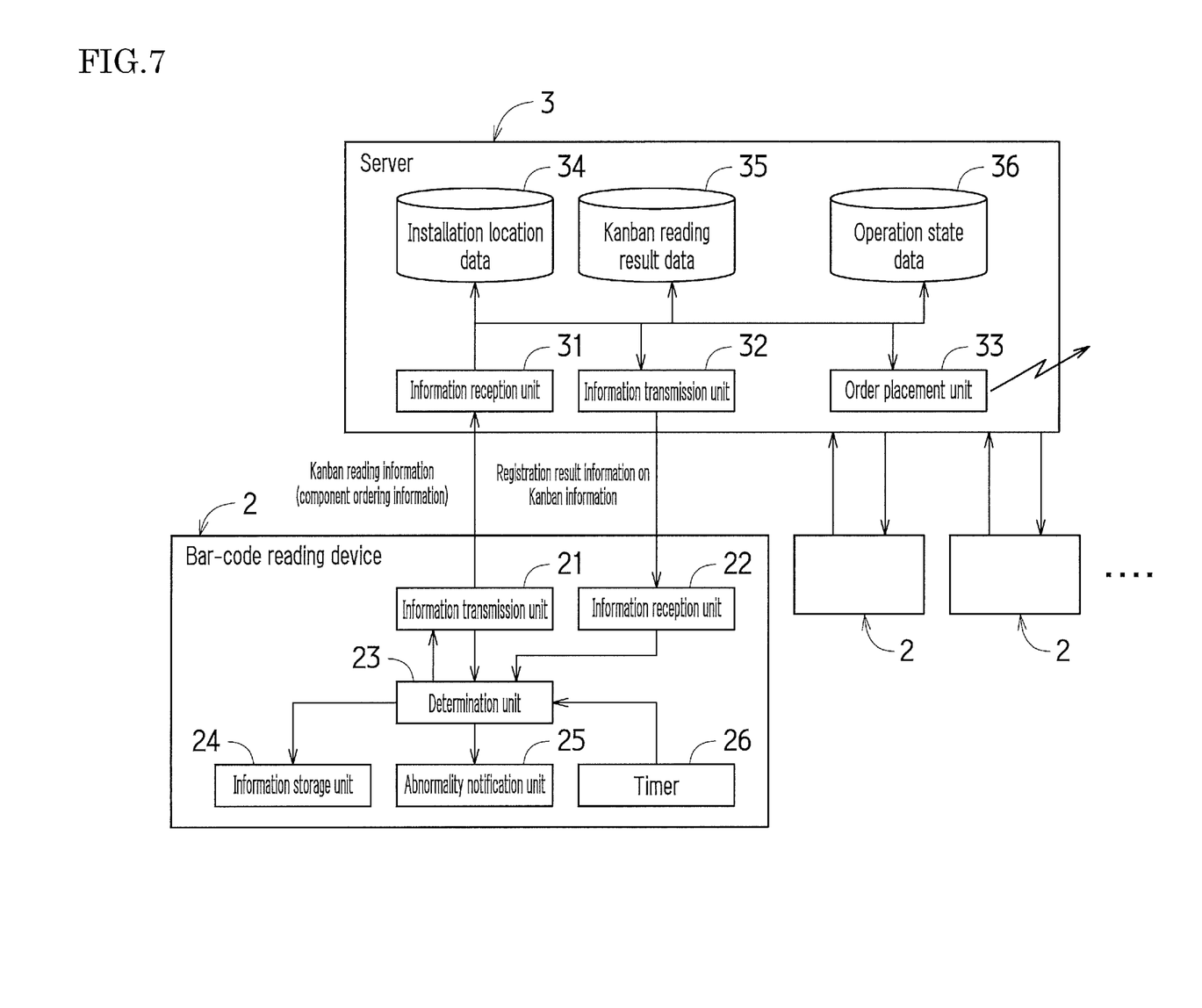
FIG. 7 is a diagram corresponding to FIG. 1 for explaining a component ordering operation.

In the component ordering operation, the Kanban 10 is inserted into the Kanban insertion slot 51a of the bar-code reading device 2 so that the bar-code reading device 2 reads the component ordering information from the bar-code 10a displayed on the Kanban 10 and then transmits the component ordering information to the server 3.

Specifically, when the Kanban 10 is inserted into the Kanban insertion slot 51a, the transport rollers 52a are rotated associated with operation of the electric motor so as to transport the Kanban 10 along the transport path (i.e. to transport downward). Then, the bar-code reading unit 53 detects whether the Kanban 10 reaches the position where the bar-code 10a is readable. When the bar-code 10a reaches the position facing the bar-code reading unit 53, the electric motor stops operating and thus the rotation of the transport rollers 52a is also stopped. In this state, the bar-code 10a is read by the bar-code reading unit 53, and the component ordering information is transmitted to the server 3.

As one example of the time point when the Kanban 10 is inserted into the Kanban insertion slot 51a, the following is possible. That is, the Kanban 10, which is to place the order of the same components, is attached in advance to a components box in which the components to be used are housed. Thus, when the components box is conveyed to the assembly station on the production line so that the components are used, the Kanban 10 attached to the components box is detached and inserted into the Kanban insertion slot 51a of the bar-code reading device 2.

The component ordering information received by the server 3 is stored (registered) in the Kanban reading result data storage unit 35, when it is determined that the component ordering information is appropriate. Then, the server 3 transmits, to the bar-code reading device 2, the response result information (registration result information on Kanban information) that the component ordering information is properly received while the server 3 causes the order placement unit 33 to transmit the component ordering information to the component manufacturer (which corresponds to the operation in the present invention that "the component ordering information is read from the component order card by the ordering information reading device, the thus-read component ordering information is transmitted from the ordering information reading device to the server so as to be registered in the server, and thus the component ordering information is transmitted from the server to the component supplier"). In this way, the component manufacturer manufactures and delivers the components according to the received component ordering information.

On the other hand, when the component ordering information received by the server 3 is not appropriate, the above information is not stored (registered) in the Kanban reading result data storage unit 35 and is re-transmitted to the bar-code reading device 2. In this case, in the bar-code reading device 2, the determination unit 23 determines that it is an abnormal state because the information re-transmitted from the server 3 is not appropriate information (registration result information on Kanban information). In response to the above determination, the abnormality notification unit 25 performs the abnormality notification operation (which corresponds to the operation in the present invention that "it is determined whether the component ordering information is registered or not in the server based on the reply information transmitted from the server in response to the information transmitted to the server after the component order card is inserted into the card insertion slot, and when it is determined that the component ordering information is not registered in the server, the ordering information reading device notifies the fact that the component ordering information is not registered in the server").

Also in this case, the electric motor stops operating and thus the rotation of the transport rollers 52a is stopped. As a result, transport of the Kanban 10 is also stopped. That is, the Kanban 10 is maintained in the state in which it is sandwiched between the transport rollers 52a and the guide plate 52c (which corresponds to the operation in the present invention that "when it is determined that the component ordering information is not registered in the server, the component order card is held without being discharged to the card receiving part").

The method for determining whether the component ordering information received by the server 3 is appropriate or not may be a publicly known method (i.e. publicly known bar-code investigating method) for investigating histories of the past component ordering information and/or the format of the read component ordering information.

Furthermore, the timer 26 starts counting at the time point when the bar-code reading device 2 transmits the component ordering information to the server 3. Then, if the server 3 does not respond (i.e. respond the response result information with respect to the received component ordering information) before the timer finishes counting (i.e. before the first time-up signal is transmitted), the determination unit 23 determines that it is an abnormal state. In this case also, the abnormality notification unit 25 performs the abnormality notification operation.

The order number in the component ordering information that is read by the bar-code reading device 2 is stored in the Kanban reading result data storage unit 35 of the server 3. Therefore, even when the Kanban 10 whose component ordering information has been already read is re-inserted into the Kanban insertion slot 51a, the thus-read component ordering information is already stored in the Kanban reading result data storage unit 35 of the server 3. Thus, this newly-read component ordering information is considered as invalid and is not transmitted to the component manufacturer, which results in prevention of duplicate order of the components. More specifically, even if the Kanban 10 is left on the floor around the bar-code reading device 2 and no worker can determine whether the component ordering information of this Kanban 10 has been already read or not, it is sufficient to insert it into the Kanban insertion slot 51*a*. If the component ordering information of this Kanban 10 has been already read, the component ordering information is not transmitted to the component manufacturer. On the other hand, if the component ordering information has not been read yet, the component ordering information is transmitted to the component manufacturer.

Also, if multiple Kanbans 10 are overlaid with one another and inserted into the Kanban insertion slot 51*a* of the bar-code reading device 2 at one time, the thickness sensor 52*b* detects abnormality, and the determination unit 23 determines that it is an abnormal state. Thus, the abnormality notification unit 25 performs the abnormality notification operation. In this case, the worker takes all the Kanbans 10 out of the Kanban insertion slot 51*a*, and inserts every Kanban 10 one by one into the Kanban insertion slot 51*a*.

(Running State Confirmation Operation with Respect to Bar-Code Reading Device)

Figure 8:
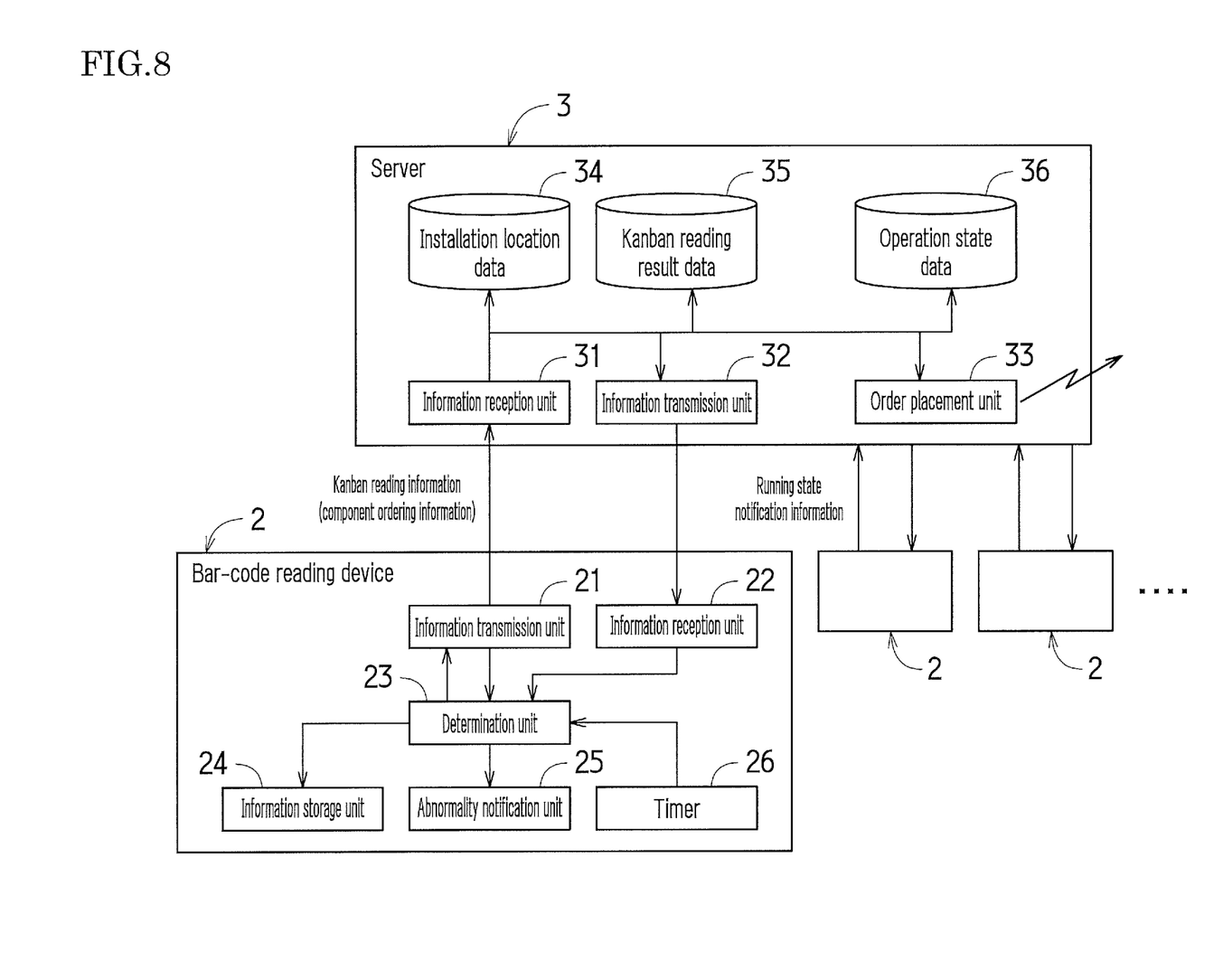
FIG. 8 is a diagram corresponding to FIG. 1 for explaining a running state confirmation operation with respect to the bar-code reading device.

If there is a bar-code reading device 2 that has not transmitted any information (such as the component ordering information) to the server 3 over a predetermined period, it is preferable to find any defect that may be generated in the bar-code reading device 2 at an initial stage. For this reason, in this embodiment, the bar-code reading device 2, which has not transmitted any information to the server 3 over the predetermined period, is to transmit information to notify the server 3 of the normal running state of the bar-code reading device 2 at the time point when the predetermined period elapses. Thus, the server 3 can recognize that the bar-code reading device 2 normally runs. Specifically, the timer 26 starts counting at the time point when the bar-code reading device 2 transmits the information (such as the component ordering information) to the server 3. Then, if the bar-code reading device 2 does not transmit any information to the server 3 before the timer 26 finishes counting, the timer 26 transmits the second time-up signal, and according to this transmission, the bar-code reading device 2 transmits the running state notification information to the server 3, as shown in FIG. 8.

In this way, when there still is a bar-code reading device 2 that does not transmit the information (the running state notification information) to the server 3 after the predetermined period elapses, it is possible to recognize, at an initial stage, that such a bar-code reading device 2 does not run normally. Thus, it is possible to maintain or replace the bar-code reading device 2 promptly, which contributes to stabilization in the operation of the system.

—Status Notification Pattern—

Here, a description will be given on the relationship between the lighting states of the respective lighting parts 56*a*, 56*b* and 56*c* on the display panel 56 of the bar-code reading device 2 and the state of the bar-code reading device 2. However, the relationship between the lighting states of the lighting parts 56*a*, 56*b* and 56*c* and the state of the bar-code reading device 2 is not limited to the following description.

Figure 9:
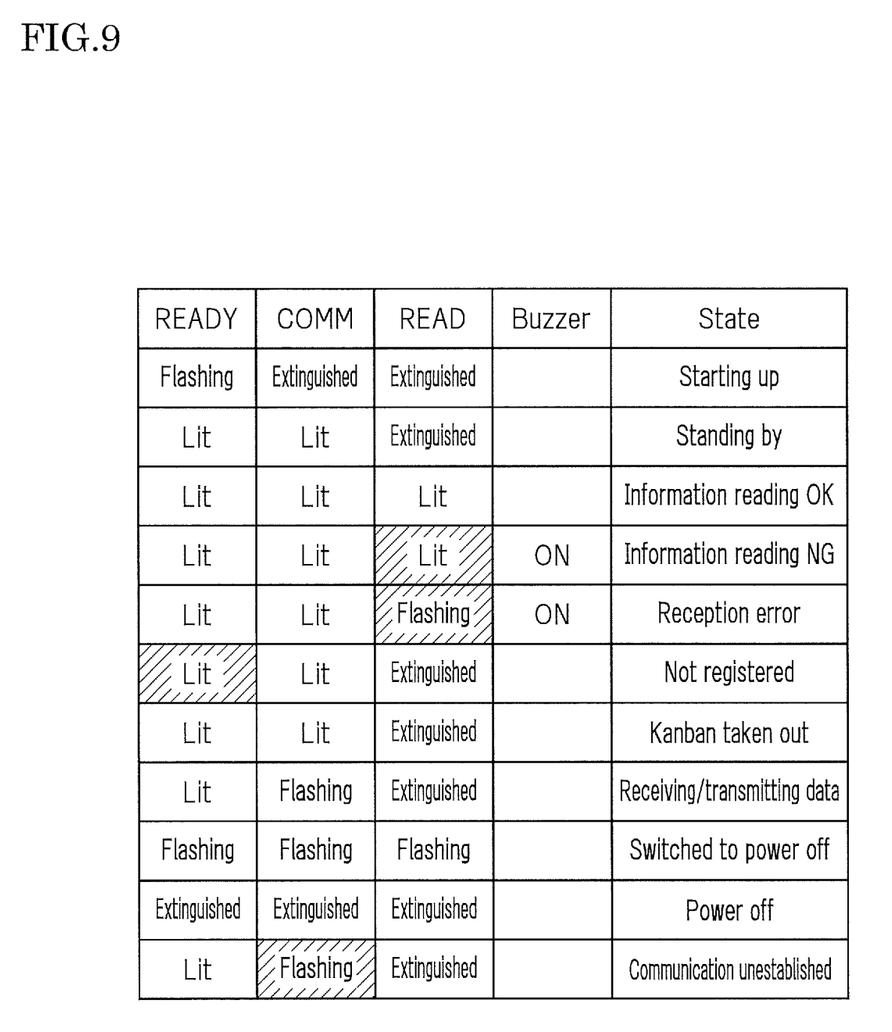
FIG. 9 is a diagram illustrating status notification patterns with respect to the bar-code reading device.

FIG. 9 is a diagram illustrating the status notification patterns of the bar-code reading device 2. In FIG. 9, the term "READY" indicates the lighting state of the lighting part 56*a*, the term "COMM" indicates the lighting state of the lighting part 56*b*, and the term "READ" indicates the lighting state of the lighting part 56*c*. In the respective lighting states, the hatched parts indicate red luminescent color and the non-hatched parts indicate green luminescent color.

As shown in FIG. 9, when the power of the bar-code reading device 2 is turned on and the bar-code reading device 2 is starting up (on the way of activation), the lighting part 56*a* is flashing in a green color, the lighting part 56*b* is extinguished, and the lighting part 56*c* is extinguished. When the bar-code reading device 2 is in the stand-by state (i.e. the state of waiting insertion of the Kanban 10) after activation, the lighting part 56*a* is lit in a green color, the lighting part 56*b* is lit in a green color, and the lighting part 56*c* is extinguished.

When the Kanban 10 is inserted into the bar-code reading device 2 and the bar-code 10*a* is properly read (i.e. when the information reading is "OK"), all the lighting parts 56*a*, 56*b* and 56*c* are lit in a green color. When the Kanban 10 is inserted into the bar-code reading device 2 but the bar-code 10*a* is not properly read, (i.e. when the information reading is "NG"), the lighting part 56*a* is lit in a green color, the lighting part 56*b* is lit in a green color, and the lighting part 56*c* is lit in a red color. At the same time, a buzzer sounds in the abnormality notification unit 25.

In this case, it is necessary to investigate the reason why the bar-code 10*a* has not been read properly. For this reason, the Kanban 10 that has caused the above problem is inserted into another bar-code reading device 2. If the bar-code 10*a* cannot be read properly also by the other bar-code reading device 2, it is determined that the Kanban 10 has a defect such as a stain, and the order placement is completed by other means (i.e. order placement not using the Kanban 10). On the other hand, if the bar-code 10*a* is read properly by the other bar-code reading device 2, it is supposed that the Kanban 10 was not properly inserted into the Kanban insertion slot 51*a*, or that the first bar-code reading device 2 is out of order. In the former case (in the case where the Kanban 10 was not properly inserted), the component ordering information that is read by the other bar-code reading device 2 is transmitted to the server 3. Therefore, the other bar-code reading device 2 here (i.e. the bar-code reading device 2 into which the Kanban 10 is secondarily inserted) is required to be assigned to the same reception site as the bar-code reading device 2 that could not properly read the bar-code 10*a*. In the latter case (in the case where the bar-code reading device 2 is out of order), the bar-code reading device 2 is maintained or replaced with another one while the ordering is completed by other means without waiting completion of the maintenance/replacement of the bar-code reading device 2.

Also, when the Kanban 10 is inserted into the bar-code reading device 2 and the bar-code 10*a* is properly read, if the reception site (specifically, the number of a specific building among the multiple buildings in the manufacturing plant) included in the thus-read component ordering information differs from the building where the bar-code reading device 2 is actually installed (i.e. reception error), the lighting part 56*a* is lit in a green color, the lighting part 56*b* is lit in a green color, and the lighting part 56*c* is flashing in a red color. At the same time, a buzzer sounds.

In this case, when the components have been erroneously delivered, the delivered components are conveyed to the building to which the component should have been delivered (the correct reception site). Also, the relationship between the bar-code reading device 2 and the reception site (i.e. the reception site to which the bar-code 2 is assigned) may be wrong. Thus, in this case, the setting information of the bar-code reading device 2 (the information on the reception site to which the bar-code 2 is assigned) is corrected.

Also, when the Kanban 10 is inserted into the bar-code reading device 2 and the bar-code 10*a* is properly read, if the individual number of the bar-code reading device 2 included the thus-read component ordering information is not registered in the server 3 (i.e. not stored in the installation location data storage unit 34), the lighting part 56*a* is lit in a red color, the lighting part 56*b* is lit in a green color, and the lighting part 56*c* is extinguished. In this case, the registration information stored in the installation location data storage unit 34 of the server 3 is confirmed. If the bar-code reading device 2 is already registered, the bar-code reading device 2 is restarted. On the other hand, if the bar-code reading device 2 is not registered, it is newly registered.

When the reading of the component ordering information is not completed because the Kanban 10 is taken out of the Kanban insertion slot 51*a* of the bar-code reading device 2, the lighting part 56*a* is lit in a green color, the lighting part 56*b* is lit in a green color, and the lighting part 56*c* is extinguished. When the component ordering information of the Kanban 10 has been read by the bar-code reading device 2 and the communication between the server 3 is going on, the lighting part 56*a* is lit in a green color, the lighting part 56*b* is flashing in a green color, and the lighting part 56*c* is extinguished.

When the bar-code reading device 2 is switched from the power-on state to the power-off state, all the lighting parts 56*a*, 56*b* and 56*c* are flashing in a green color. Then, when the power of the bar-code reading device 2 is turned off, all the lighting parts 56*a*, 56*b* and 56*c* are extinguished.

Also, when the communication between the bar-code reading device 2 and the server 3 is not established, the lighting part 56*a* is lit in a green color, the lighting part 56*b* is flashing in a red color, and the lighting part 56*c* is extinguished. In this case, if the communication between the other bar-code reading devices 2 and the server 3 is not established, it is supposed that a network failure or a system failure occurs. Thus, network or system is maintained. Also, when the information of the other bar-code reading devices 2 is stored in the server 3, the bar-code reading device 2, of which the communication with the server 3 is not established, is maintained or replaced with another one, or registered in the server 3.

—Effects of Embodiment—

As described above, in this embodiment, when it is determined that the component ordering information is not registered in the server 3, based on the reply information transmitted from the server 3 in response to the information transmitted to the server 3 after the Kanban 10 is inserted into the Kanban insertion slot 51*a* of the bar-code reading device 2, the bar-code reading device 2 notifies the fact that the component ordering information is not registered in the server 3 while holding the Kanban 10 without discharging it to the Kanban receiving part 55. Thus, the worker can recognize, by the notification, that the component ordering information has not been registered in the server 3 and that the Kanban 10 is been held. Then, the worker inserts, once again, the held Kanban 10 into the Kanban insertion slot 51*a* so that the component ordering information is read from the Kanban 10. In other words, the worker easily recognizes the Kanban 10 that is needed to be inserted again into the Kanban insertion slot 51*a*, which contributes to maintenance of reliability in the component order as well as to efficiency in the component ordering work.

Also in this embodiment, when the bar-code reading device 2 is activated, the bar-code reading device 2 transmits the activation notification information to the server 3, and as a response, the server 3 transmits, to the bar-code reading device 2 as the sender, data on the individual information and the installation location of the bar-code reading device 2. Thus, the bar-code reading device 2 is not required to have a non-volatile memory so as to store the data on the individual information and the installation location when the power is turned off, which leads to reduction in costs. Generally, many components are used in the automobile manufacturing plant and the like, which results in a large number of bar-code reading devices 2. However, in this embodiment, the cost for each bar-code reading device 2 can be reduced, which leads to considerable reduction in costs in the whole manufacturing plant.

Also in this embodiment, when the bar-code reading device 2 does not receive the data on the individual information and the installation location from the server 3 within the predetermined period from the time point when the bar-code reading device 2 transmits the activation notification information to the server 3 subsequent to the activation thereof, it is determined to be an abnormal state. Thus, it is possible to find a default in the system promptly.

Also in this embodiment, if the server 3 does not transmits, as the response, the reply information within the predetermined period from the time point when the Kanban 10 is inserted into the Kanban insertion slot 51*a* of the bar-code reading device 2, it is determined to be an abnormal state. Thus, the worker can re-insert the Kanban 10 into the Kanban insertion slot 51*a* so that the component ordering information is properly read, which contributes to maintenance of high reliability in the component order.

Also in this embodiment, when the bar-code reading device 2 does not transmit any information to the server 3 over the predetermined period after the bar-code reading device 2 has transmitted the information to the server 3, then the bar-code reading device 2 transmits to the sever 3 the information that the bar-code reading device 2 normally runs. In this way, when there still is a bar-code reading device 2 that does not transmit the information to the server 3 after the predetermined period elapses, it is possible to recognize, at an initial stage, that such a bar-code reading device 2 does not run normally. As a result, it is possible to maintain or replace the bar-code reading device 2 promptly, which contributes to stabilization in the operation of the system.

—Other Embodiments—

The present invention is not limited to the foregoing embodiment. All modifications and changes that come within the meaning and range of equivalency of the claims are intended to be embraced therein.

For example, in the above embodiment, the present invention is applied to a component ordering system 1 that is installed in the automobile manufacturing plant. However, the present invention is not limited thereto. The present invention may be applied to a component ordering system in another type of manufacturing plant.

Also, in the above embodiment, the bar-code 10*a* is used as means for displaying the component ordering information on the Kanban 10. However, the present invention is not limited thereto. It is possible to use a QR. Code (Registered Trademark by DENS WAVE INCORPORATED).

Also, in the above embodiment, the bar-code 10*a* is displayed on only one surface of the Kanban 10. However, the present invention is not limited thereto. The bar-code 10*a* may be displayed on each surface of the Kanban 10. In this way, even when the direction of the Kanban 10 inserted into the Kanban insertion slot 51a is inside out, the bar-code 10a can be read by the bar-code reading unit 53.

INDUSTRIAL APPLICABILITY

The present invention can be suitably applied to a component ordering system by the Kanban method in an automobile manufacturing plant.

REFERENCE SIGNS LIST

1 Component ordering system
2 Bar-code reading device (ordering information reading device)
23 Determination unit
25 Abnormality notification unit (notification unit)
26 Timer
3 Server
33 Order placement unit
34 Installation location data storage unit
35 Kanban reading result data storage unit
4 Installation location registering device
51a Kanban insertion slot (card insertion slot) Kanban transport part
52a Transport roller (holding part)
52c Guide plate (holding part)
55 Kanban receiving part (card receiving part)
10 Kanban (component order card)

What is claimed is:

1. A component ordering system that is installed in an automobile manufacturing plant, the component ordering system comprising:
a server; and
an ordering information reading device installed at an assembly station on a production line of the automobile manufacturing plant,
wherein the ordering information reading device is configured to: read component ordering information from a component order card; and transmit, to the server, the component ordering information so that the component ordering information is registered in the server,
wherein the server is configured to transmit the component ordering information to a component supplier,
wherein the ordering information reading device includes: a casing, a component order card insertion slot provided on an upper face of the casing and into which the component order card is inserted; a component order card receiving part attached to a lower face of the casing and to which the component order card whose component ordering information has been read is discharged; and a holding part configured to hold the component order card without discharging the component order card to the component order card receiving part,
wherein the ordering information reading device is further configured to determine whether the component ordering information is registered in the server based on reply information that is transmitted from the server in response to information that is transmitted from the ordering information reading device to the server after the component order card is inserted into the component order card insertion slot,
wherein the ordering information reading device is configured to discharge the component order card to the component card receiving part based on determining that the component ordering information is registered in the server, and hold the component order card in the holding part without discharging the component order card to the component card receiving part based on determining that the component ordering information is not registered in the server, and
wherein the ordering information reading device is further configured to notify the worker of the automobile manufacturing plant based on determining that the component ordering information is not registered in the server.

2. The component ordering system according to claim 1, wherein:
the server includes an installation location data storage unit that is configured to store data on individual information and an installation location of the ordering information reading device,
when the ordering information reading device is activated and activation notification information is transmitted from the ordering information reading device to the server, the data on the individual information and the installation location of the ordering information reading device is transmitted, as a response, from the server to the ordering information reading device.

3. The component ordering system according to claim 2, wherein:
the ordering information reading device is configured to determine that an abnormal state occurs when the ordering information reading device does not receive the data on the individual information and the installation location from the server within a predetermined period from a time point when the ordering information reading device transmits the activation notification information to the server subsequent to the activation of the ordering information reading device.

4. The component ordering system according to claim 1, wherein:
when the ordering information reading device does not receive the reply information from the server within a predetermined period from a time point when the component order card is inserted into the component order card insertion slot, the ordering information reading device is configured to determine that an abnormal state occurs.

5. The component ordering system according to claim 1, wherein:
when the ordering information reading device does not transmit any information to the server over a predetermined period after the ordering information reading device has transmitted information to the server, the ordering information reading device is configured to transmit, to the server, information that the ordering information reading device normally runs.

6. The component ordering system according to claim 1, wherein the ordering information reading device is configured to notify the worker of the automobile manufacturing plant of the fact that the component ordering information is not registered in the server by flashing a lamp of the ordering information reading device.

7. The component ordering system according to claim 1, wherein the ordering information reading device is configured to notify the worker of the automobile manufacturing plant of the fact that the component ordering information is not registered in the server by sounding a buzzer of the ordering information reading device.

* * * * *